United States Patent [19]

Rausch et al.

[11] Patent Number: 4,829,163

[45] Date of Patent: May 9, 1989

[54] CRACK DETECTOR FOR HEATED GLASS PANEL

[75] Inventors: Richard A. Rausch; Donald O. Ruff, both of Anderson, Ind.

[73] Assignee: General Motors Corporation, Detroit, Mich.

[21] Appl. No.: 153,397

[22] Filed: Feb. 8, 1988

[51] Int. Cl.4 .............................................. H05B 3/10
[52] U.S. Cl. .................................... 219/547; 219/203; 219/522
[58] Field of Search ............... 219/203, 509, 547, 522, 219/541, 202, 511, 218

[56] References Cited

U.S. PATENT DOCUMENTS

| | | | |
|---|---|---|---|
| 3,858,027 | 12/1974 | Phillips | 219/203 |
| 3,944,893 | 3/1976 | Hayden | 219/203 X |
| 3,973,140 | 8/1976 | Phillips | 219/203 X |
| 4,343,010 | 8/1982 | Denny et al. | 219/509 X |
| 4,506,137 | 3/1985 | Meister | 219/203 |
| 4,539,466 | 9/1985 | Yamamoto | 219/203 |
| 4,562,509 | 12/1985 | Lindgren | 219/509 |
| 4,565,919 | 1/1986 | Bitter et al. | 219/509 |
| 4,730,097 | 3/1988 | Campbell et al. | 219/203 |

*Primary Examiner*—E. A. Goldberg
*Assistant Examiner*—M. M. Lateef
*Attorney, Agent, or Firm*—Tim G. Jaeger

[57] ABSTRACT

An improvement is provided for an electrically heated glass panel of the type where a resistive film is disposed on the panel and is connected between and along the length of a pair of spaced bus bars each of which is terminated in a respective voltage input terminal and where one of the bus bars includes a connector section to which the resistive film is not connected extending from the input terminal of the bus bar to a junction point on the bus bar beyond which the resistive film is connected to the bus bar. A sensor conductor is disposed on the glass panel and connected from at or beyond the junction point on the one bus bar to a sensor terminal and extends generally adjacent to the connector section of the bus bar. Prior to applying a high voltage across the input terminals of the bus bars to energize the resistive film when it is desired to heat the glass panel, a low voltage incapable of producing an arc across any break in the connector section of the one bus bar is applied to the input terminal of such bus bar. The power supply is disabled in response to the presence of a predetermined voltage difference between the sensor terminal and the input terminal of the one bus bar indicating the presence of a break in the connector section of the bus bar so as to prevent the development of an arc across the break.

3 Claims, 3 Drawing Sheets

CRACK DETECTOR FOR HEATED GLASS PANEL

This invention relates to an electrically heated glass panel such as the windshield of an automotive vehicle.

More particularly, the invention relates to a heated glass panel of the type where a resistive film is disposed on the panel and is connected between and along the length of a pair of spaced bus bars each of which is terminated in a respective voltage input terminal. It is common in such heated glass panels that at least one of the bus bars includes a connector section (to which the resistive film is not connected) extending from the input terminal of the bus bar to a junction point on the bus bar beyond which the resistive film is connected to the bus bar. A high voltage is applied across the input terminals of the bus bars from a power supply to energize the resistive film when it is desired to heat the glass panel.

In the event of a break in the glass panel extending through the connector section of the one bus bar, undesired arcing could result when the high voltage is applied across the input terminals. To prevent such arcing, the invention provides a sensor conductor disposed on the glass panel and connected from at or beyond the junction point on the bus bar to a sensor terminal. The sensor conductor extends generally adjacent to the connector section of the one bus bar. Further, in accordance with the invention, means are provided for disabling the power supply to prevent the application of the high voltage across the input terminals of the bus bars in response to the presence of a predetermined voltage difference between the sensor terminal and the input terminal of the one bus bar indicating the presence of a break in the connector section of the bus bar.

In addition, pursuant to the invention, low voltage (preferably battery voltage) is applied to the input terminal of the one bus bar prior to turning on the high voltage power supply. If there is a break in the connector section of the bus bar, the predetermined voltage difference will appear between the sensor terminal and the input terminal of the one bus bar and the high voltage power supply will not be turned on. If the low voltage was not first applied to the input terminal of the one bus bar, the high voltage power supply would be turned on until the presence of the break was detected and then the power supply would be shut off. During this turn on/shut off process, an undesired incipient arc condition could develop across the break. The foregoing "continuity test' feature of the invention eliminates the possibility of such an incipient arc condition. The low voltage is too low to produce any arc across the bus bar break.

The foregoing and other aspects and advantages of the invention may be best understood by reference to the following detailed description of the preferred embodiments when taken in conjunction with the accompanying drawing in which.

Figure 1:
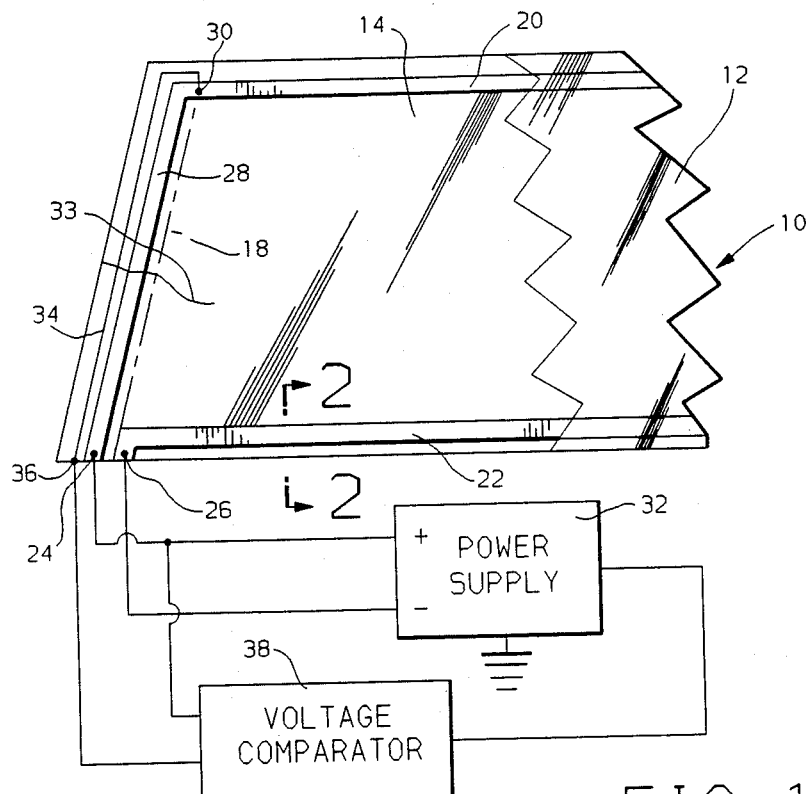
FIG. 1 is a schematic diagram of one embodiment of the invention.
Figure 2:
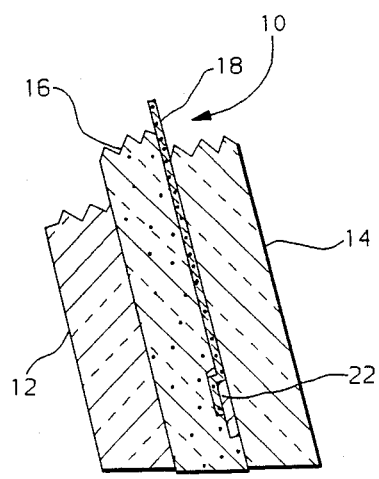
FIG. 2 is a cross-section of a portion of the multilayered glass panel shown in FIG. 1.

Referring to FIGS. 1 and 2 of the drawing, a multilayered glass panel 10, which may be the windshield of an automotive vehicle, comprises an inner glass layer 12, an outer glass layer 14, and an intermediate layer 16 of clear insulator material. Disposed over the inner surface of the outer glass layer 14 is a transparent resistive film 18. The resistive film is connected between and along the length of a pair of spaced, electrically conductive bus bars 10 and 22 which are also disposed on the inner surface of the outer glass layer 14. The bus bars 20 and 22 are terminated in voltage input terminals 24 and 26, respectively. Further, the bus bar 20 includes a generally vertical connector section 28 (to which the resistive film 18 is not connected) extending from the voltage input terminal 24 to a junction point 30 beyond which the resistive film 18 is connected to the bus bar 20.

A power supply 32 is connected across the input terminals 24 and 26 of the bus bars 20 and 22 for applying a high voltage, e.g., 70-90 volts DC, therebetween to energize the resistive film 18 when it is desired to heat the multilayered glass panel 10.

In the event of a crack or break in the outer glass layer 14 extending through the connector section 28 of the bus bar 20 (as shown for example by the line 33) undesired arcing across the break can result when the high voltage is applied between the input terminals 24 and 26. To prevent such arcing, the invention provides a sensor conductor 34 also disposed on the inner surface of the outer glass layer 14 of the panel 10. The sensor conductor 34 is connected to the bus bar 20 at or beyond the junction point 30 and extends, generally adjacent the connector section 28 of the bus bar 20, to a sensor terminal 36.

Further, in accordance with the invention, a voltage comparator 38 is responsive to the presence of a predetermined voltage difference between the sensor terminal 36 and the bus bar terminal 24, indicative of a crack extending through the connector section 28 of the bus bar 20, to disable the power supply 32 to prevent the application of the high DC voltage across the input terminals 24 and 26 of the bus bars 20 and 22, respectively.

The power supply 32 and comparator 38 may be implemented within the system shown in prior pending U.S. patent applications Ser. No. 050,999 entitled High DC Voltage Power Supply For Motor Vehicle Electrical System filed May 15, 1987 as a continuation-in-part of prior Ser. No. 897,023 filed Aug. 15, 1987 and Ser. No. 050,582 entitled Dual Mode Windshield Heater Control filed May 15, 1987 as a continuation-in-part of prior Ser. No. 896,816 filed Aug. 15, 1987. The disclosure of both prior pending U.S. patent applications Ser. Nos. 050,582 and 050,999 are hereby incorporated as if set forthfully herein, are hereby made available to the public upon request by the assignee of this application, and will hereafter be referred to herein as the Incorporated Disclosure.

Figure 3:
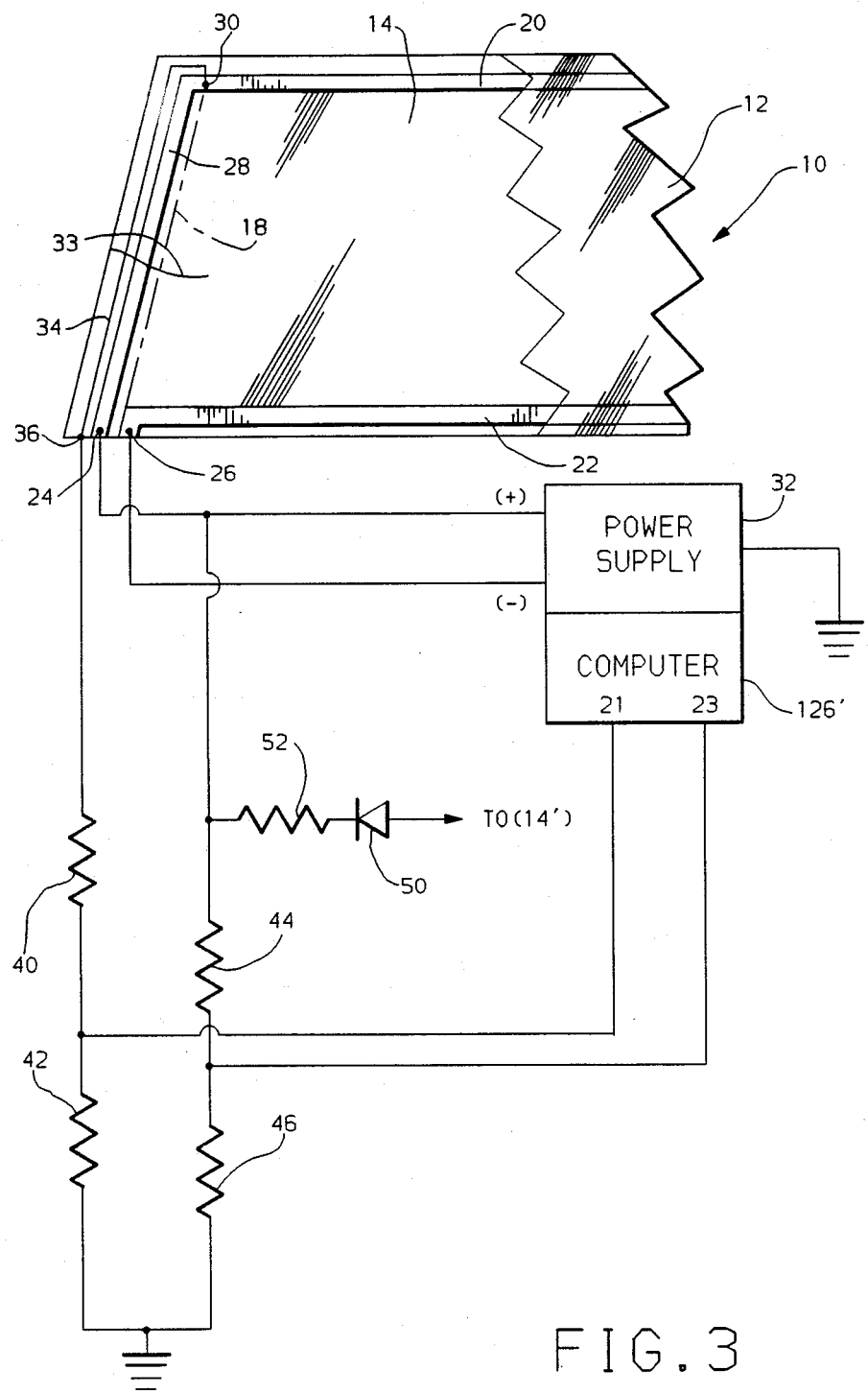
FIG. 3 is a more detailed schematic diagram of a specific embodiment of the invention.

Referring to the Incorporated Disclosure, the windshield crack detector arrangement shown and described therein is replaced by the embodiment of this invention illustrated in FIG. 3 hereof. Elements shown and described in FIG. 3 hereof that are also shown and described in the Incorporated Disclosure are designated in FIG. 3 hereof by the same respective numerals used to designate such elements in the Incorporated Disclosure except that the numerals are primed in FIG. 3 hereof. Elements shown and described in FIG. 3 hereof that are not shown and described in the Incorporated Disclosure are designated in FIG. 3 hereof by unprimed numerals.

Referring to FIG. 3 hereof, the digital computer 126' (which may be a Motorola Model No. MC 6805R2 microcomputer) includes pins 21 and 23 which are analog voltage inputs to the analog to digital converter unit of the computer 126'. Specifically, pin 21 is connected to the junction between a pair of voltage divider resistors 40 and 42 which are connected in series between the sensor terminal 36 of sensor conductor 34 and ground. Similarly, pin 23 is connected to the junction between a pair of voltage divider resistors 44 and 46 which are connected in series between the voltage input terminal 24 of bus bar 20 and ground. Preferably, the total, resistance of the voltage divider networks 40–42 and 44–46 is sufficiently high that the current drain from terminals 24 and 36 is negligible. Filter elements may be employed in conjunction with the voltage divider networks 40–42 and 44–46 as desirable.

In operation, a crack in the windshield 10 (such as indicated by line 33) passing through connector section 28 of bus bar 20 (or through sensor conductor 34) will cause a voltage difference between the input terminal 24 of bus bar 20 and the sensor terminal 36 of sensor conductor 34. This voltage difference will be reflected between pins 21 and 23 of the computer 126' via voltage divider resistors 40–46. Provided that the voltage difference between terminals 24 and 36 is greater than a given threshold difference (e.g., 10 volt difference), the computer 126' will interpret the corresponding voltage difference between pins 21 and 23 as indicating the presence of a crack 33 in the windshield 10 having the potential to produce an undesired arc condition unless the power supply 32 is disabled or deenergized.

Figure 4:
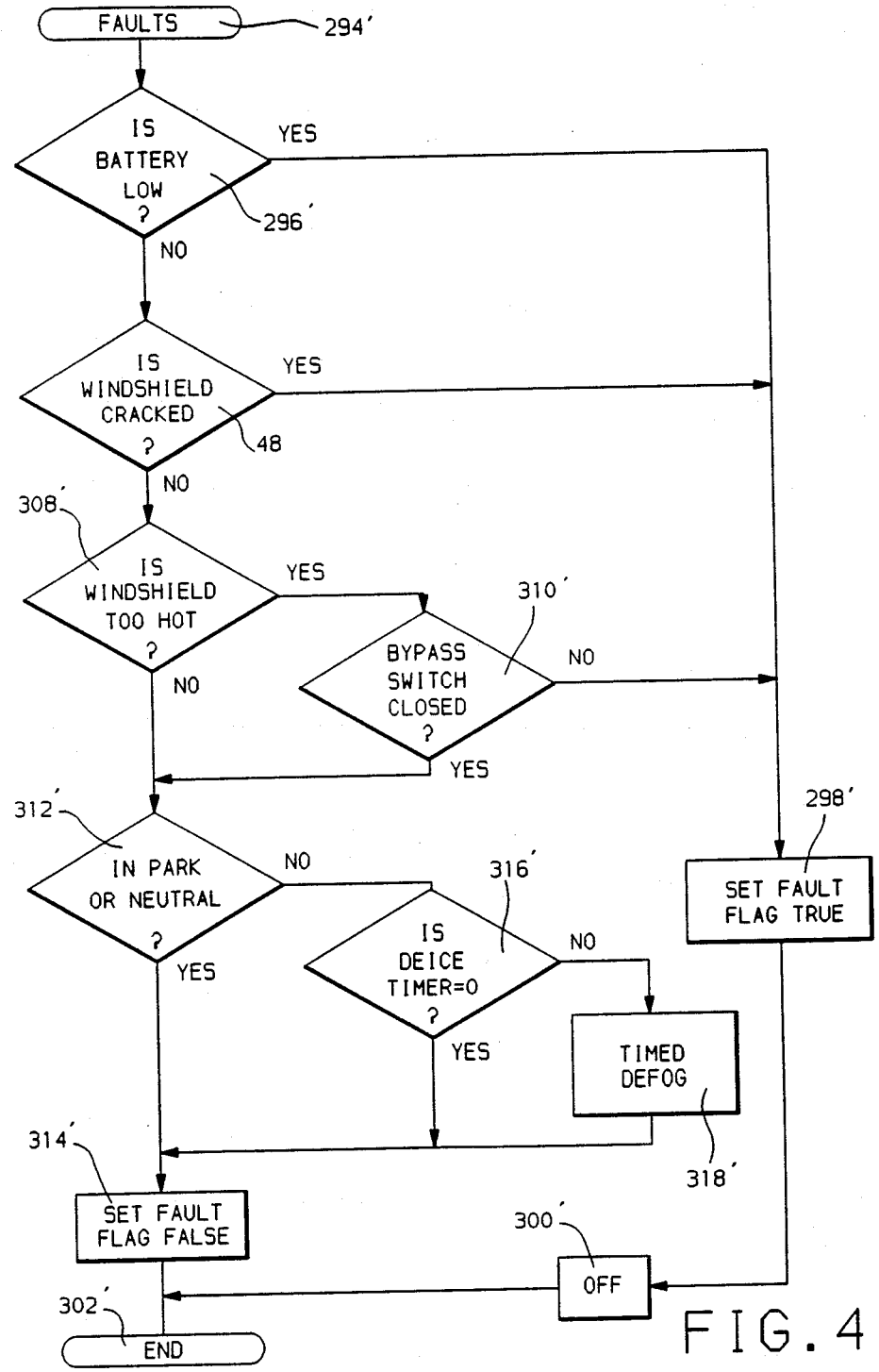
FIG. 4 is a flow diagram useful in explaining the operation of the FIG. 3 embodiment.

As related to the present crack detector invention, the computer 126' functions in accordance with a program embodied within a faults routine flow chart as shown in FIG. 4 which is the same as the faults routine flow chart shown in FIG. 8 of the Incorporated Disclosure except for changes occasioned by the present invention. Elements shown and described in FIG. 4 hereof that are also shown and described in FIG. 8 of the Incorporated Disclosure are designated in FIG. 4 hereof by the same respective numerals used to designate such elements in FIG. 8 of the Incorporated Disclosure except that such numerals are primed in FIG. 4 hereof. Elements shown and described in FIG. 4 hereof that are not shown and described in FIG. 8 of the Incorporated Disclosure are designated in FIG. 4 hereof by unprimed numerals.

Referring to FIG. 4 hereof, the faults routine checks the heated windshield system for any problems or faults. The faults routine begins at point 294' and proceeds as described in the Incorporated Disclosure with the following exception: At decision step 48, the computer 126' determines whether the voltage difference between pins 21 and 23 indicates that the windshield 10 is cracked through the connector section 28 of the bus bar 20 (or sensor conductor 34). If decision 48 is yes, the program proceeds to set the fault flag true at step 298' and then proceeds to execute an off routine as described in FIG. 12 of the Incorporated Disclosure which disables or deenergizes the power supply 32.

A crack (such as that indicated by line 33) may occur in the windshield 10 during a period when the power supply 32 is turned on or during a period when the power supply 32 is shut off. In the first case, with the power supply 32 energized and applying the high DC voltage across the bus bar input terminals 24 and 26, the crack detector arrangement of the invention is effective to sense the cracked condition and shut off the power supply 32 as previously described. The operation is the same in the second case when the power supply 32 is next energized to apply the high DC voltage between the bus bar input terminals 24 and 26. In either case, however, an incipient arc may develop across the crack 33 in the connector section 28 of the bus bar 20 before the power supply 32 can be shut off. This incipient arc condition is short-lived, and while undesirable, it is tolerable.

Fortunately, pursuant to an added feature of the invention, the foregoing undesired incipient arc condition can be eliminated altogether for the case where the crack 33 occurs during a period when the power supply 32 is shut off. Specifically, this may be accomplished by applying battery voltage (or a similar low voltage which is too low to produce any arc across the crack 33) from line 14' to the input terminal 24 of the bus bar 20 via a diode 50 and a current limiting resistor 52. With this arrangement, the computer 126' will detect the presence of a cracked windshield condition immediately upon operation of the vehicle ignition switch (not shown) which applies the low battery voltage to line 14' and will disable the high voltage power supply 32 before it can be turned on or energized. Note that for this arrangement to be effective, there must be no current path from the bus bar terminal 24 to ground through the power supply 32.

It should be recognized that the foregoing embodiments of the invention are disclosed for purposes of illustration only and are not intended to unduly limit the invention. As will be appreciated by those skilled in the art, other modifications to the illustrated embodiments are possible within the spirit and scope of the invention. For example, one of the bus bar input terminals 24 or 26 may be grounded and the power supply 32 altered accordingly. In some applications, the high voltage applied between the bus bar terminals 24 and 26 may be AC rather than DC. Further, the voltage comparator 38 may be implemented by means other than the digital computer 126', e.g., by an analog operational amplifier such as a Motorola Model No. LM 2902 together with appropriate companion elements.

What is claimed is:

1. For an electrically heated glass panel of the type where a resistive film is disposed on the panel and is connected between and along the length of a pair of spaced bus bars each of which is terminated in a respective voltage input terminal and where one of the bus bars includes a connector section to which the resistive film is not connected extending from the input terminal of the bus bar to a junction point on the bus bar beyond which the resistive film is connected to the bus bar, and including a power supply for applying a high voltage across the input terminals of the bus bars to energize the resistive film when it is desired to heat the glass panel; an improvement for preventing in the event of a break in the glass panel extending through the connector section of the one bus bar undue arcing across such break when the high voltage is applied to the input terminals, the improvement comprising:

a sensor conductor disposed on the glass panel and connected from at or beyond the junction point on the one bus bar to a sensor terminal and extending generally adjacent to the connector section of the bus bar;

means for applying a low voltage to the input terminal of the one bus bar incapable of producing an arc across any break in the connector section of such bus bar prior to applying the high voltage across the input terminals of the bus bars; and means for disabling the power supply to prevent the application of the high voltage across the input terminals of the bus bars in response to the presence of predetermined voltage difference between the sensor terminal and the input terminal of the one bus bar indicating the presence of a break in the connector section of such bus bar.

2. The improvement of claim 1 in which the electrically heated glass panel is in an automotive vehicle and the low voltage is derived from the vehicle battery.

3. For an electrically heated glass panel of the type where a resistive film is disposed on the panel and is connected between and along the length of a pair of spaced bus bars each of which is terminated in a respective voltage input terminal and where one of the bus bars includes a connector section to which the resistive film is not connected extending from the input terminal of the bus bar to a junction point on the bus bar beyond which the resistive film is connected to the bus bar, and including a power supply for applying a high voltage across the input terminals of the bus bars to energize the resistive film when it is desired to heat the glass panel; an improvement for preventing in the event of a break in the glass panel extending through the connector section of the one bus bar undue arcing across such break when the high voltage is applied to the input terminals, the improvement comprising:

a sensor conductor disposed on the glass panel and connected from at or beyond the junction point on the one bus bar to a sensor terminal and extending generally adjacent to the connector section of the bus bar; and means for disabling the power supply to prevent the application of the high voltage across the input terminal of the bus bars in response to the presence of a predetermined voltage difference between the sensor terminal and the input terminal of the one bus bar indicating the presence of a break in the connector section of such bus bar.

* * * * *